April 2, 1963 J. HEGENER 3,083,689
DIRECT RECORDING PEN
Filed Feb. 18, 1960
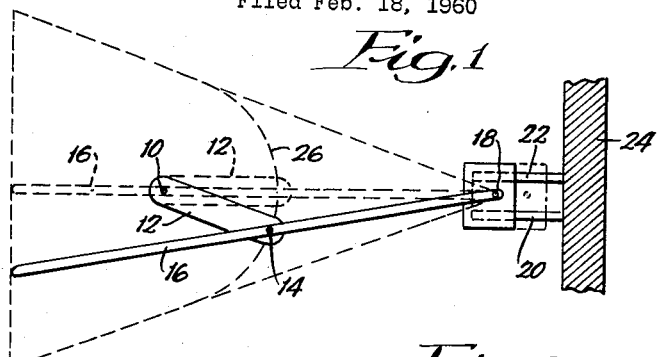
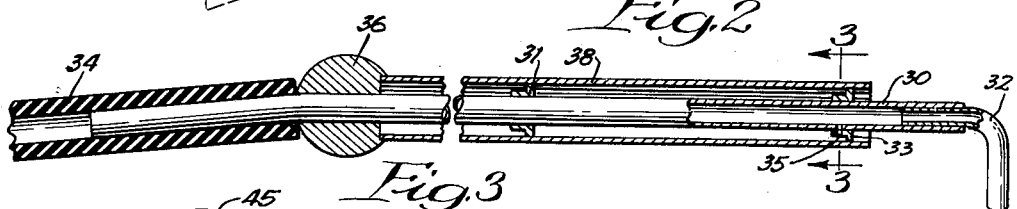
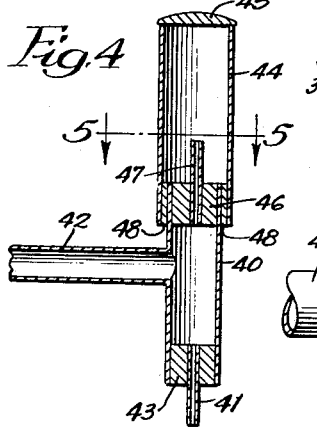
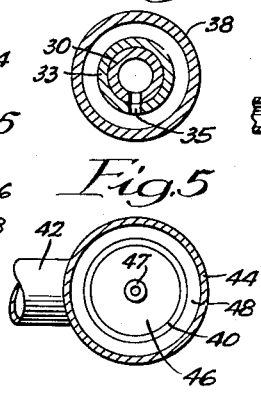
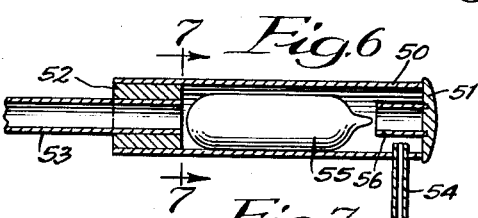
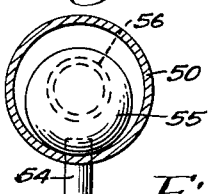
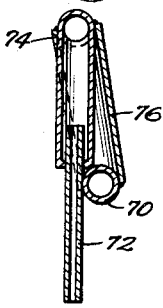
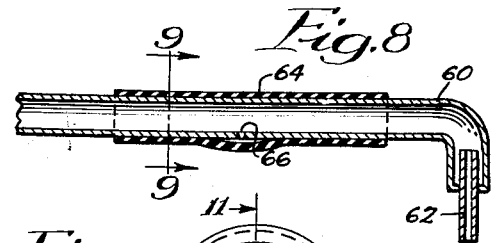
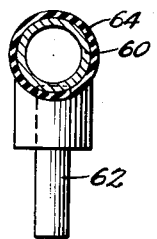
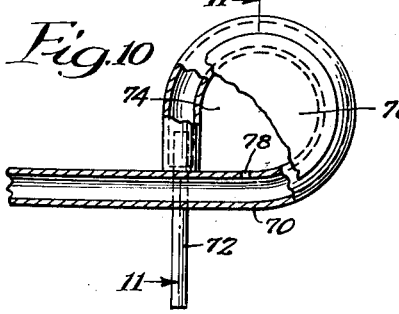
INVENTOR:
Joseph Hegener,
BY Louis Bernar
ATTORNEYS.

United States Patent Office 3,083,689
Patented Apr. 2, 1963

3,083,689
DIRECT RECORDING PEN
Joseph Hegener, Norwell, Mass., assignor to Massa Division of Cohu Electronics, Inc., a corporation of Delaware
Filed Feb. 18, 1960, Ser. No. 9,480
3 Claims. (Cl. 120—42.06)

This invention relates generally to a direct recording pen and more particularly to a direct recording pen of the type adapted for use with high speed oscillographs.

Recording instruments such as electrodynamic oscillographs are known in the art which are adapted to record on suitable record members the instantaneous values of electrical information signals such as may be obtained from measurements in a large variety of mechanical and electrical structures. Commonly, a recording pen or stylus is rigidly attached to the oscillating coil of the electrodynamic oscillograph so that the oscillations of the coil are transferred to direct oscillograph recordings on the moving paper chart upon which the oscillating pen rides.

As prior art oscillating coil oscillographs of the D'Arsonval type generally produce curvilinear distortion due to the rotary motion given the pen tip by the oscillating coil it has been necessary to print the recording charts with curvilinear coordinates. This and other difficulties inherent in prior art oscillating coil oscillographs have been overcome by the high speed electrodynamic vibrating oscillograph disclosed in application Serial No. 565,820, filed February 16, 1956, now Patent No. 2,932,776, issued April 12, 1960, wherein curvilinear distortion is eliminated by the provision of a unique linkage mechanism capable of translating a curvilinear movement into a translatory movement for producing a straight line rectilinear drive for the recording pen or stylus.

As a result of the translatory drive given the recording pen and of the relatively high speeds attained, direct inking pens of the type utilized in prior art recorders have produced poor and interrupted line recordings when used with recorders of the type described in the above identified application Serial No. 565,820. Forces conditioned by the mode and extent of movement of the pen cause pulsations of the ink in the pen feed line with the result that the ink tracing lines are interrupted and discontinuous.

It is a general object of this invention to provide an improved pen for high speed recorders.

It is another object of this invention to provide such an improved recording pen adapted for use with either high speed curvilinear or rectilinear drives or combinations of the same.

It is a further object of this invention to provide such an improved pen capable of recording electrical signal pulses of relatively short duration in an uninterrupted and continuous manner.

It is a still further object of this invention to provide such an improved pen which is characterized by its simplicity, efficiency, and relative economy of manufacture and operation.

Although this invention is particularly described for use with a high speed recorder of the straight line type it will be apparent that the described recording pen equally is applicable to many other types of recording instruments and that a rectilinear drive recorder is selected only as an example of the type of recorder with which the pen advantageously can be used.

Thus, in accordance with a specific illustrative embodiment of this invention, the recording pen comprises means for smoothing out the pulsations of ink which are present in the feed line of the pen during its high speed operation. Advantageously, these means include a mechanical filter or surge absorber incorporated in the pen structure. As the ink feed line acts as the generator of the forces causing the pulsations of ink during high speed operation the filter preferably is located close to the writing tip of the pen.

Advantageously in one embodiment of the invention, the filter comprises a compliance in the form of a volume of totally enclosed air communicating with the ink feed line by means of a suitable bore therebetween which acts as the inertia or inductance element of the filter system. In another embodiment of the invention the compliance is in the form of a thin resilient sleeve of suitable length and elastic properties which lies concentric on the periphery of the feed line near the pen nib or tip. In this embodiment the ends of the sleeve are sealed to the feed line and one or more small holes are provided in the feed line under the sleeve to enable the ink to expand or contract the sleeve.

In still another embodiment of the invention the compliance takes the form of a volume of air totally enclosed in a flexible and stretchable container such as a small rubber bag which floats in an enlarged portion of the ink feed line near the pen tip.

The effective mass of the filter is the mass of the ink from the location of the compliance to the tip of the pen. In the operation of the invention, the pulsations of ink in the feed line resulting from the high speed rectilinear and/or curvilinear motion of the pen cause the totally enclosed air comprising the compliance to be compressed in one form and the elastic sleeve comprising the compliance to be stretched in another form of the invention. The surge absorbing properties of the compliance in each instance smooths out the ink pulsations in the feed line to effect a continuous and unbroken ink tracing despite the high speed and straight line nature of the pen drive.

The above and other features of novelty which characterize the invention are pointed out with particularity in the claims annexed to and forming a part of this specification. For a better understanding of this invention, its advantages and specific objects attained by its use, reference is had to the accompanying drawing and descriptive material in which is shown and described an illustrative embodiment of the invention.

In the drawing:

FIGURE 1 shows a linkage mechanism for translating a curvilinear motion into a rectilinear drive for a recorder pen with which the invention may be utilized;

FIGURE 2 is a side cross sectional view of a high speed recording pen embodying the invention;

FIGURE 3 is an end view in cross section taken on line 3—3 of the pen embodiment shown in FIGURE 2;

FIGURE 4 is a side view in cross section of another embodiment of the invention;

FIGURE 5 is a top view in cross section taken on line 5—5 of the embodiment shown in FIGURE 4;

FIGURE 6 is a side view in cross section of still another embodiment of the invention;

FIGURE 7 is an end cross sectional view taken on line 7—7 of the pen embodiment shown in FIGURE 6;

FIGURE 8 is a side view in cross section of still another embodiment of the invention;

FIGURE 9 is an end view in cross section taken on line 9—9 of the pen embodiment shown in FIGURE 8;

FIGURE 10 is a side view partially broken away and in section of still another embodiment of the invention; and FIGURE 11 is an end cross sectional view taken on line 11—11 of the embodiment of FIGURE 10.

Referring now to the drawing, there is shown in FIGURE 1 a pen drive for translating the curvilinear motion of the pen motor into a straight line drive for the rectilinear displacement of a recording pen. This linkage mechanism, described in greater detail in application Serial No. 565,820, now Patent No. 2,932,776, issued April 12, 1960, comprises the shaft 10 adapted to be rotated in accordance with the electrical information signals applied to the recorder. A cross member 12 is fixedly secured at one end thereof to shaft 10 and at the other end thereof is connected by means of pivot 14 to the body of the pen 16.

The rearward portion of pen 16 is connected to a pivot pin 18 extending downwardly at right angles therefrom. Pivot pin 18 advantageously is freely mounted between a pair of spaced parallel guide members 20 and 22 extending outwardly from the recorder housing 24. It can be seen from FIGURE 1 that the mounting of pen 16 by means of pivot pin 18 between guide members 20 and 22 is such that the pen is free not only to rotate about the axis of pivot pin 18 but also is free to execute translatory displacement between parallel guide members 20 and 22.

The linkage mechanism of FIGURE 1 is adapted to correct the curvilinear distortion produced by D'Arsonval types of movements which are only capable of angular rotation. Cross member 12 is shown dotted to correspond to the central position of pen 16, also shown dotted. For a given angular rotation of shaft 10, cross member 12 will be rotated to the full line position shown in FIGURE 1. Since the axis of shaft 10 remains fixed, pivot 14 is forced to prescribe a curve 26, shown dotted in FIGURE 1. This motion, in turn, causes pivot pin 18 to move laterally between guide members 20 and 22, which together with rotational movement about its own vertical axis, provides straight line rectilinear displacements of the tip of pen 16. It has been found that by the proper choice of the length of cross member 12 and the location of pivot pin 18 in relation to the length of pen 16, it is possible to transform the curvilinear motion of the pen drive to the substantially straight line motion of the tip of pen 16 as illustrated in dotted line form in FIGURE 1.

It will be appreciated that due to the rather complex movements of pen 16, pulsations will be set up in the ink flowing through its feed line from the ink well to the pen nib. These pulsations are particularly serious when the pen is used with a recorder capable of operating at relatively high speeds. It has been found that when recording pens of prior art constructions are used with the drive mechanism of FIGURE 1, interruptions and discontinuities of ink tracing lines are produced upon the record medium.

In accordance with aspects of the instant invention, these pulsations are damped to provide a smooth and continuous flow of ink by means of a unique pen construction having a mechanical filter incorporated therein for absorbing the surges or sudden changes of pressure in the ink feed line. In one embodiment of the invention as shown in FIGURES 2 and 3 of the drawing the pen comprises an elongated tubular member 30 which defines an ink feed line and has at one end thereof a writing nib 32 rigidly secured and sealed thereto. The other end of tubular member 30 is connected to a source of ink (not shown) which advantageously may be an ink well mounted on the recorder, by means of a piece of flexible tubing 34. The pen may be pivotally connected to the driving mechanism by any suitable means such as the trunnion or pivot shaft 36.

A compliance chamber, defined by an elongated compliant or flexing tubular member 38 having a diameter greater than that of an associated compliant or flexing tubular member 30, advantageously is mounted in spaced relation to tubular member 30. Tubular member 38 has a portion thereof sealed in a conventional manner such as by means of plugs 31 and 33, which advantageously may be soldered to the inner circumference of tubular member 38. In this manner a predetermined volume of totally enclosed air is sealed within the compliance chamber by plugs 31 and 33.

A bore 35 is provided in plug 33 for communicating the enclosed air in the compliance chamber with the ink feed line in tubular member 30. Thus, it will be appreciated that a filter comprising the mechanical compliance defined by the entrapped volume of air communicated to the ink feed line by means of bore 35 and the mechanical mass defined by the mass of the ink from the location of the compliance to the pen nib 32 serves as a surge absorber to damp the pulsations of ink present in the flexing pen when it is operated at high speeds. Stated in other words, the pen comprises an air spring which is compressed by sudden increases in pressure in the ink line to modify and absorb these changes and which expands upon decreases in pressure in the ink line to maintain a substantially steady pressure therein for providing a smooth and continuous flow of ink from pen nib 32.

During a comprehensive experimental investigation that was undertaken in determining the effect of the size of the bore 35 and the volume of the air compliance chamber formed between the outer surface of the tube 30 and the inner surface of the tube 38, it was found that when the volume of air in the chamber was made of the same order of magnitude or greater than the volume of ink contained in the bore of the tube 30, the pulsations of the ink and the interrupted writing of the pen were eliminated. The volume of the ink and the corresponding air volume is taken between the planes defined by the separator 33 and separator 31. Although the ratios of these volumes are not critical, it was observed that as the air volume became less than the ink volume the writing deteriorated, whereas as the air volume increased relative to the ink volume the writing progressively improved. It was also observed during the experiments that as the bore of the orifice 35 became less than 0.005 inch, the writing was deteriorated, and if the diameter of the bore 35 exceeded approximately 1/32 inch, the writing was also deteriorated. Therefore, the approximate range of diameters for the orifice 35 for which smooth writing is obtained lies between about 0.005 inch and 0.030 inch, and the approximate range for the diameter of the tube 30 lies between 0.020 and 0.090 inch.

Another embodiment of the invention is shown in FIGURES 4 and 5 of the drawing and comprises a cylindrical member 40 connected at one side thereof to the pen feed line 42. At one end of member 40 a pen nib 41 is rigidly mounted as by means of a sealed ring 43 of aluminum or the like. A cylindrical compliance member 44 is mounted to the other end of member 40. Advantageously compliance member 44 is of greater diameter than chamber 40 and is fitted over one end thereof and sealed thereto by means of an aluminum filler 48 or the like. Compliance chamber 44 is sealed at its upper end by a cap 45 and is closed at its lower end by a ring 46 having a bore therein through which is inserted a tube 47. Tube 47 is open at each end thereof and serves to communicate the trapped air in compliance member 44 to the ink in member 40. It will be understood that in the operation of the pen the totally enclosed air in the compliance member serves as a surge absorber for sudden changes of pressure in the ink feed line to provide a smooth and continuous flow of ink to pen nib 31.

FIGURES 6 and 7 disclose another embodiment of the invention which comprises an enlarged ink feed member 50 sealed at one end thereof by a cap 51 and at the other end thereof by a ring 52. Ring 52 has a bore therein through which is inserted the pen ink feed line 53. A writing nib 54 is inserted through a bore provided in one wall of enlarged member 50 and is sealed in place therein. In this embodiment of the invention the mechanical compliance comprises a flexible envelope 55 which advantageously may be a small rubber bag or the like. Envelope 55 is adapted to float in the enlarged portion of the ink line defined by member 50. A bumper 56 for envelope 55 may be placed within member 50 and held therein by cap 51.

In the operation of this embodiment of the invention the totally enclosed volume of air within envelope 55 is compressed in response to sudden surges of ink in the ink feed line to dampen these surges and provide a smooth and continuous flow of ink to pen tip 54.

In the embodiment of the invention shown in FIGURES 8 and 9 of the drawing, the ink feed line comprises an elongated tubular member 60 having a pen nib 62 sealed in one end thereof. The compliance comprises a relatively thin sleeve 64 of suitable length and elastic properties which lies concentric on the circumference of the feed line near the pen nib. In accordance with one preferred embodiment of the invention sleeve 64 comprises a suitable length of relatively thick rubber tubing. One or more small holes such as hole 66 is provided in the feed line under the elastic sleeve to enable the ink to expand or contract the sleeve in accordance with variations in pressure thereof to thereby smooth out the flow of ink in the pen.

Still another embodiment of the invention is shown in FIGURES 10 and 11 of the drawing.

In this embodiment the feed line comprises an elongated tubular member 70 curved back on itself to provide a substantially closed loop. At the open end of line 70 the writing nib 72 is supported in sealed relation. A pair of thin side walls 74 and 76 are sealed to each side of the loop such that a volume of air is totally enclosed therebetween. Advantageously the side walls 74 and 76 may comprise a pair of very thin metallic plates which are cemented at their circumferential surfaces to the loop portions of the feed line in a continuous and air tight fashion. A bore 78 is provided through the feed line such that the entrapped air in the cavity defined by the loop and side walls 74 and 76 is communicated with the ink in feed line 70. Thus in the operation of the device the enclosed volume of air in the cavity serves to absorb surges and pulsations of ink in the feed line during its operation.

It will be understood by those skilled in the art that modifications may be made in the construction and arrangement of the parts of the above described high speed recording pen without departing from the real spirit and purpose of the invention and that it is intended to cover by the appended claims any modified function of structure or equivalents which may reasonably be included within their scope.

This application is a continuation in part of my copending application, Serial No. 604,509, filed August 16, 1956, now abandoned.

What is claimed as the invention is:

1. A direct inking recording stylus adapted for high speed recording comprising a nib adapted to ride upon a moving recording surface for recording information thereon; an inner tubular member having one end affixed to said nib, a pivotal trunnion having an opening therein, the opposite end of said inner tubular member being positioned within said opening, an outer tubular member rigidly mounted to said trunnion and sealed at its extremities, said inner tubular member being coaxially positioned within said outer tubular member thereby forming a compliant chamber therebetween, said inner tubular member being formed with a communicating bore connecting said inner tubular member with said compliant chamber to provide pressure compensation when said stylus is being subjected to extreme varying accelerations.

2. A direct inking recording stylus adapted for high speed recording comprising a nib adapted to write upon a moving recording surface for recording information thereon, a resilient inner tubular member having one end affixed to said nib, a pivotal trunnion having an opening therein, the opposite end of said inner tubular member being positioned within said opening, a resilient outer tubular member rigidly mounted to said trunnion and sealed thereagainst, said inner tubular member being coaxially positioned within said outer tubular member, a source of ink connected to said inner tubular member through said trunnion, a sealing collar connecting said inner tubular member to said outer tubular member to form a compliant chamber therebetween, said inner tubular member being formed with a communicating bore connecting said inner tubular member with said compliant chamber, said inner tubular member and said outer tubular member having similar resilient physical characteristics for retaining the compliant chamber configuration when said stylus is being subject to extreme variable accelerations.

3. A direct inking recording stylus adapted for high speed recording comprising a nib adapted to write upon a moving recording surface for recording information thereon, a resilient inner tubular member having one end affixed to said nib, a pivotal trunnion having an opening therein, the opposite end of said inner tubular member being positioned within said opening, an outer tubular compliant member rigidly mounted to said trunnion and sealed at its extremities, said inner tubular member being coaxially positioned within said outer compliant member to form a compliant chamber therebetween, said inner tubular member being formed with a communicating bore connecting said inner tubular member with said compliant chamber to provide pressure compensation, said outer compliant member being capable of restraining the flexural characteristics of said inner resilient member for substantially retaining the compliant chamber configuration when said stylus is subjected to extreme variable accelerations.

References Cited in the file of this patent

UNITED STATES PATENTS

| | | |
|---|---|---|
| 301,205 | Bertram | July 1, 1884 |
| 655,731 | Pierce | Aug. 14, 1900 |
| 2,223,541 | Baker | Dec. 3, 1940 |